Patented Sept. 10, 1929.

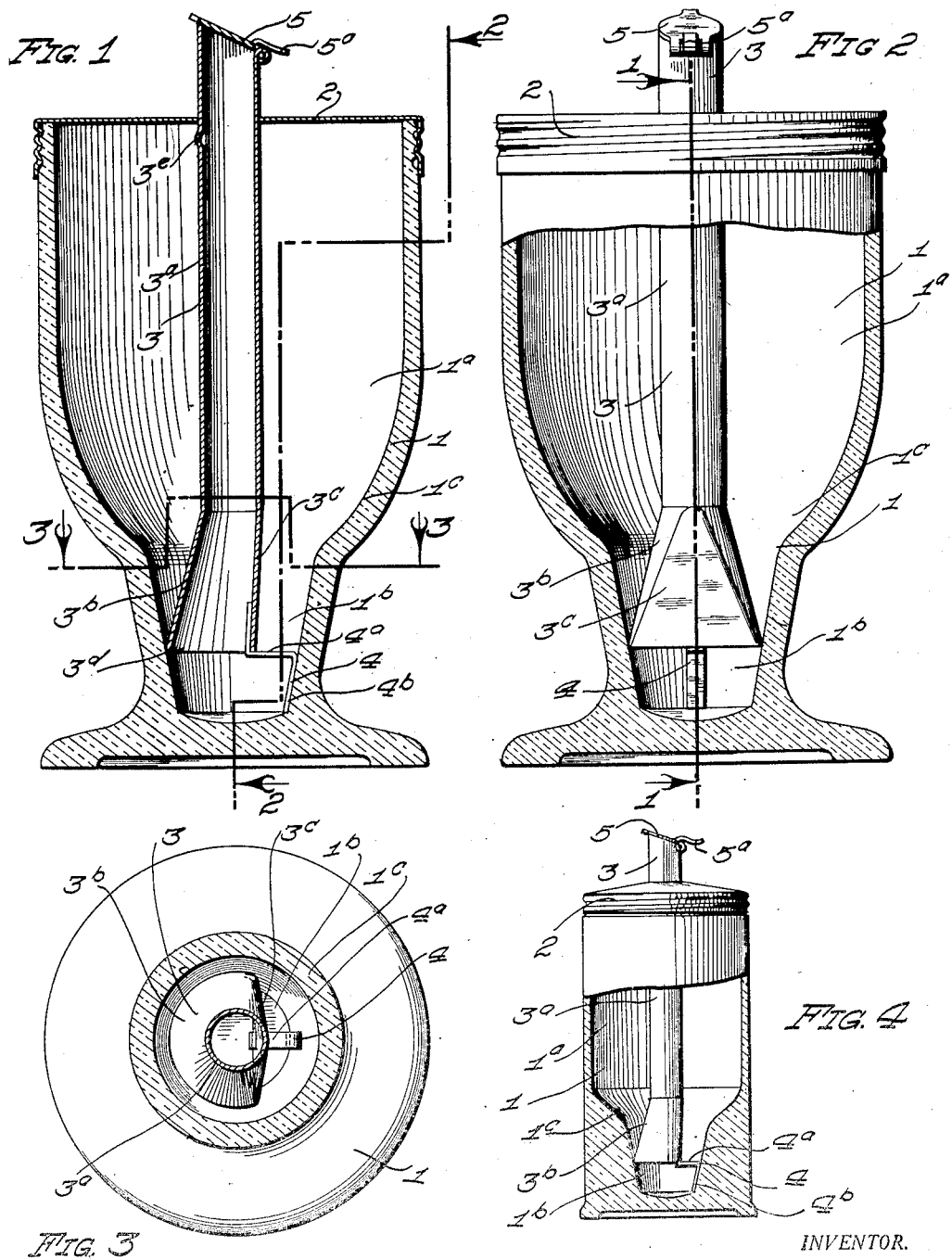

1,727,799

UNITED STATES PATENT OFFICE.

AUGUSTUS ABBOTT, OF SAN DIEGO, CALIFORNIA, ASSIGNOR, BY MESNE ASSIGNMENTS, TO TAYLOR BROTHERS MANUFACTURING CORPORATION, OF ELKHART, INDIANA, A CORPORATION OF INDIANA.

SUGAR-DISPENSING CONTAINER.

Application filed December 12, 1927. Serial No. 239,513.

My invention relates to dispensing containers, particularly to containers for dispensing measured quantities of the contents of the container, such as for measuring spoonfuls of sugar, and the like.

The objects of my present invention are: first, to provide a device of this class which will measure accurately the amount of contents of the container adapted to be dispensed at one time; second, to provide a device of this class in which the contents cannot readily clog the discharge member; third, to provide a device of this class in which the contents, such as sugar, will not crust easily, and if any of the contents does crust, the same can be easily broken up, and that which is not wholly broken up will readily be discharged from the container; fourth, to provide a device of this class from which the spout or discharge member may be easily removed and in which the same may be readily replaced; fifth, to provide a device of this class, all parts of which may be easily kept clean; sixth, to provide novel means for supporting the lower end of the spout or discharge member within a measuring portion of the container; seventh, to provide as a whole a novelly constructed sugar dispensing container; and, eighth, to provide a device of this class which is particularly simple and economical of construction, durable, reliable, easy to operate, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a sectional elevational view of my sugar dispensing container in its preferred form of construction with the section taken through 1—1 of Fig. 2, a portion of the cover being shown in elevation to facilitate the illustration; Fig. 2 is a partial sectional and partial elevational view thereof taken at 2—2 of Fig. 1; Fig. 3 is a sectional view thereof taken through 3—3 of Fig. 1; and, Fig. 4 is a partial sectional and partial elevational view of my sugar dispensing container in a slightly modified form of construction.

Like characters of reference refer to similar parts and portions throughout the views of the drawings.

My dispensing container consists essentially and preferably of a container 1, a cover 2 for the upper end of the container, a spout or discharge member 3, a supporting and agitating clip or bracket 4 at the lower end of the spout or discharge member, and a cover 5 for the upper or discharge end of the spout or discharge member.

The container 1 in both the preferred and modified construction is preferably made of molded glass and is provided in its interior with an upper or main compartment $1^a$ and with a recess or measuring compartment $1^b$ at the central portion of the lower end of the main compartment. The recess or measuring compartment $1^b$ extends to near the lower end of the container 1 and is in the form of an inverted frustum of a cone, the side wall thereof being downwardly converging. The lower portion of the main compartment immediately above the recess or measuring compartment is provided with a downwardly inclined wall $1^c$ which may be either straight or curved, as shown respectively in the modified form of construction and in the preferred construction. The inclined wall at the lower end of the main compartment serves as a funnel for directing the contents from the main compartment into the upper end of the recess or measuring compartment, as shown, the inclination of the inclined portion of the wall $1^c$ being such as to easily direct the contents of the main compartment 1 downwardly by gravity.

The spout or discharge member 3 consists preferably of two distinct portions, namely, a tubular portion $3^a$ extending from near the lower end of the member 3 to the upper end thereof, and of an outwardly flaring or inverted funnel shaped portion $3^b$ at the lower end of the tubular portion and forming substantially a continuous part with the tubular portion. The upper end of the portion 3ᵇ is preferably circular and merges with the lower circular end of the tubular portion, while the lower end of the portion 3ᵇ is in the form of a segment of a circle of more than semicircular extent, the whole of the one side of the portion 3ᵇ being flattened from the upper end to the lower edge, this flattened side being indicated by 3ᶜ. The exterior side 3ᵈ of the lower edge of the circular portion only of the portion 3ᵇ engages the inclined side wall of the recess 1ᵇ intermediate the upper and lower ends for an extent greater than a semicircle, as shown best in Fig. 3. The flattened side 3ᶜ, and therefore the lower edge thereof, is spaced from the inclined side wall of the recess 1ᵇ providing a relatively large opening for the discharge of a portion of the contents from the main compartment 1ᵃ into the recess 1ᵇ to the open lower end of the flaring or funnel shaped portion 3ᵇ of the spout or discharge member 3. By reason of the construction of the lower end of the portion 3ᵇ, the lower end of the member 3 may be, to a certain extent, held in position against disengagement of the circular portion of the lower end thereof from the side wall of the recess 1ᵇ except when the spout member is raised slightly. To provide positive means to prevent such disengagement when the spout member is raised slightly I have provided a clip or bracket 4 at the lower end of the inverted funnel shaped portion 3ᵇ. This clip may be in the form of a Z with one leg thereof secured to the flattened side of the portion 3ᶜ, at the inner side thereof, with the intermediate or connecting portion 4ᵃ extended toward the adjacent inclined side wall of the recess 1ᵇ and with the other leg 4ᵇ extended downwardly adjacent and in engagement with such side wall and with the lower end of the leg 4ᵇ resting on the bottom wall of the recess, as shown. This clip 4, aside from supporting the lower end of the spout or discharge member from the bottom of the recess and against the side wall thereof, also serves as a means for agitating the contents of the container within the recess and for breaking up the contents which may be crusted or formed in larger bodies.

The cover 2 may be secured to the upper open end of the container 1 in any suitable manner, such as by screwing the same thereon, as shown. The upper portion of the spout or discharge member extends preferably through the central portion of the cover and may be easily rotated therein for agitating the contents within the container. There is preferably provided at the exterior portion of the tubular portion 3ᵃ immediately below the cover, a lug 3ᵉ to prevent the withdrawal of the member 3 to a considerable extent when the cover is secured in position.

In order to prevent foreign matter from being poured into the container or from being deposited upon or mixed with the contents thereof through the upper open end of the spout or discharge member 3, there may be provided a cover 5 which may be in the form of a plate pivotally mounted at one edge at one side of the member 3. This cover may be held in position by gravity and may be automatically opened when the contents is poured from the container. However, in order to facilitate the opening of said cover 5, there may be provided an ear 5ᵃ which may be extended backwardly over the pivotal portion so that the same may be readily depressed and the cover raised with the index finger.

The upper end of the member 3 is preferably cut at an angle so as to suggest readily from which side the contents is to be discharged.

The container 1, in the preferred form of construction, is made in the form of a goblet primarily to reduce the quantity of glass required in making the container. However, if a straight cylindrical container is desired, the same may be formed as shown in Fig. 4, providing also a heavier base which may be desirable in certain cases.

Though I have shown and described a particular construction, combination and arrangement of parts and portions, and a certain modification thereof, I do not wish to be limited to this particular construction, combination and arrangement, nor to the modification, but desire to include in the scope of my invention the construction, combination and arrangement substantially as set forth in the appended claims.

Having thus described my invention, what I claim as new and desire to secure by Letters Patent is:

1. In a device of the class described, a container having a main compartment and a recess at its lower end, the side wall of the recess being downwardly converging and the side wall of the main compartment terminating at the lower end in a funnel shaped portion extending to the upper end of and merging with the side wall of the recess, a cover for the upper end of the main compartment, and a spout member positioned in said container and extending through the cover, a portion of the lower end of the spout member being flared outwardly and positioned with its lower edge against and supported by the inclined side wall of the recess.

2. In a device of the class described, a container having a main compartment and a recess at its lower end, the side wall of the recess being downwardly converging and the side wall of the main compartment terminating at the lower end in a funnel shaped portion extending to the upper end of and merging with the side wall of the recess, a cover for the upper end of the main compartment, and a spout member positioned in said container and extending through the cover, a portion of the lower end of the spout member being flared outwardly and positioned with its lower edge against and supported by the inclined side wall of the recess, the opposite side of the lower flared portion of the spout member being spaced from the wall of the recess to permit a portion of the contents from the main compartment to pass into said recess and to the lower end of the flared portion of the spout member.

3. In a device of the class described, a container having a main compartment and a recess at its lower end, the side wall of the recess being downwardly converging and the side wall of the main compartment terminating at the lower end in a funnel shaped portion extending to the upper end of and merging with the side wall of the recess, a cover for the upper end of the main compartment, a spout member positioned in said container and extending through the cover, a portion of the lower end of the spout member being flared outwardly and positioned with its lower edge against and supported by the inclined side wall of the recess, the opposite side of the lower flared portion of the spout member being spaced from the wall of the recess to permit a portion of the contents from the main compartment to pass into said recess and to the lower end of the flared portion of the spout member, and a supporting arm secured to the lower end of the spout member and extended toward the side and bottom wall of the recess for supporting said spout member from the bottom of the recess and the flared portion thereof against the side wall of the recess.

4. In a device of the class described, a container having a main compartment and a downwardly converging measuring recess at its lower end, and a spout member positioned in said container and provided at its lower end with an inverted funnel shaped portion, a portion of the lower edge thereof being positioned against and supported by the inclined side wall of the recess.

5. In a device of the class described, a container having a main compartment and a downwardly converging recess at its lower end, and a spout member positioned in said container and provided at its lower end with an inverted funnel shaped portion, a portion of the lower edge thereof being positioned against and supported by the inclined side wall of the recess, the lower edge of the inverted funnel shaped portion of the spout member engaging the inclined side wall of the recess the greater portion of its circumference.

6. In a device of the class described, a container having a main compartment and a downwardly converging recess at its lower end, and a spout member positioned in said container and provided at its lower end with an inverted funnel shaped portion, a portion of the lower edge thereof being positioned against and supported by the inclined side wall of the recess, the opposite side of the inverted funnel shaped portion being spaced from the side wall of the recess and provided at its lower edge with an arm extending toward said wall.

7. In a device of the class described, a container having a main compartment and a downwardly converging recess at its lower end, and a spout member positioned in said container and provided at its lower end with an inverted funnel shaped portion, a portion of the lower edge thereof being positioned against and supported by the inclined side wall of the recess, the opposite side of the inverted funnel shaped portion being spaced from the side wall of the recess and provided at its lower edge with an arm extending toward said wall, and supported at its extended end on the bottom of the recess.

8. In a device of the class described, a container having a main compartment and a recess at its lower end, and a spout member positioned in said container with its upper end extending therefrom, the lower end of said spout member being enlarged and positioned with the lower end thereof against the side wall of the recess for more than half of the circumference of the recess, the other portion of the enlarged portion being spaced from the side wall of the recess permitting a portion of the contents from the main compartment to pass into said enlarged portion.

9. In a device of the class described, a container having a main compartment and a recess at its lower end, and a spout member positioned in said container with its upper end extending therefrom, the lower end of said spout member being enlarged and positioned with the lower end thereof against the side wall of the recess for more than half of the circumference of the recess, the other portion of the enlarged portion being spaced from the side wall of the recess permitting a portion of the contents from the main compartment to pass into said enlarged portion, the portion of the enlarged portion spaced from the wall of said recess being provided with a laterally extended arm adapted to support said spout member from the bottom of the recess and to serve as an agitator at the lower end of the spout member.

10. In a device of the class described a container having a main compartment and a recess at its lower end, a spout member positioned within said container with its upper end extending to the upper end, the lower end of said spout member being positioned against the side wall of the recess for more than half the circumference thereof, the other portion of the lower end being spaced from the side wall of the recess to permit the contents from the main compartment to pass to the lower end of the spout member.

11. In a device of the class described, a container having a main compartment and a recess at its lower end, a spout member positioned within said container with its upper end extending to the upper end, a portion of the lower end of the spout member being positioned against the side wall of the recess and the other portion being spaced from the side wall of the recess, the lower end of the spout member being provided with a laterally extended arm extending beyond the portion spaced from the side wall of the recess and extended toward the portion of said side wall from which it is spaced and adapted to engage said portion of the wall for positioning said spout member in said recess with its lower end from the bottom thereof.

12. In a device of the class described, a container having a main compartment and a recess at its lower end, a spout member positioned within said container with its upper end extending to the upper end of the container, a portion of the lower end of the spout member being positioned against the side wall of the recess and the other portion being spaced from the side wall of the recess, the lower end of the spout member being provided with a laterally extended arm extending beyond the portion spaced from the side wall of the recess and extended toward the portion of said side wall from which it is spaced and adapted to engage said portion of the wall for positioning said spout member in said recess.

In testimony whereof, I have hereunto set my hand at San Diego, California, this 3rd day of December, 1927.

AUGUSTUS ABBOTT.